United States Patent [19]

Biale

[11] Patent Number: 5,326,814
[45] Date of Patent: Jul. 5, 1994

[54] HIGH-GLOSS LATEX PAINTS AND POLYMERIC COMPOSITIONS FOR USE THEREIN

[75] Inventor: John Biale, Anaheim, Calif.

[73] Assignee: Rohm and Haas Company, Philadelphia, Pa.

[21] Appl. No.: 785,463

[22] Filed: Oct. 31, 1991

Related U.S. Application Data

[63] Continuation-in-part of Ser. No. 363,492, Jun. 8, 1989, Pat. No. 5,084,505, and a continuation-in-part of Ser. No. 722,360, Jun. 19, 1991, Pat. No. 5,173,534, which is a continuation of Ser. No. 303,805, Jan. 30, 1989, abandoned.

[51] Int. Cl.$^5$ .............................................. C08L 33/00
[52] U.S. Cl. .................................... 524/555; 524/558; 524/560; 524/317; 526/318.4; 526/318.44; 526/318.3; 526/312
[58] Field of Search ............... 524/555, 558, 560, 317; 526/318.4, 318.44, 318.3, 312

[56] References Cited

U.S. PATENT DOCUMENTS

| | | | |
|---|---|---|---|
| 2,606,892 | 8/1952 | Kropa et al. | 260/80.3 |
| 2,718,516 | 9/1955 | Bortnick | 260/86.1 |
| 2,727,020 | 12/1955 | Melamed et al. | 260/80.3 |
| 2,821,544 | 1/1958 | Holtschmidt | 260/486 |
| 2,882,259 | 4/1959 | Graham | 260/45.5 |
| 3,290,350 | 12/1966 | Hoover | 260/453 |
| 3,299,007 | 1/1967 | Suling et al. | 260/77.5 |
| 3,453,223 | 7/1969 | Suling et al. | 260/17 |
| 3,630,984 | 12/1971 | Sheetz | 260/29.6 |
| 4,011,388 | 3/1977 | Murphy et al. | 526/320 |
| 4,153,592 | 5/1979 | Burroway et al. | 526/318.4 |
| 4,222,909 | 9/1980 | Brixius et al. | 260/18 TN |
| 4,233,198 | 11/1980 | Nolken | 260/29.6 |
| 4,251,421 | 2/1981 | Hertler | 260/31.2 |
| 4,264,748 | 4/1981 | Oriel et al. | 525/109 |
| 4,273,690 | 6/1981 | Walus | 260/22 CB |
| 4,320,221 | 3/1982 | Hoffman | 528/69 |
| 4,492,780 | 1/1985 | Zimmerschied et al. | 524/45 |
| 4,514,552 | 4/1985 | Shay et al. | 524/813 |
| 4,608,314 | 8/1986 | Turpin et al. | 526/301 |
| 4,617,230 | 10/1986 | Shah et al. | 428/288 |
| 4,624,762 | 11/1986 | Abbey et al. | 524/507 |
| 4,713,412 | 12/1987 | Czerepinski et al. | 524/833 |

FOREIGN PATENT DOCUMENTS

| | | |
|---|---|---|
| 1153140 | 8/1980 | Canada . |
| 0007042 | 6/1979 | European Pat. Off. . |
| 0075529 | 9/1982 | European Pat. Off. . |
| 0083781 | 12/1982 | European Pat. Off. . |
| 2091277 | 1/1982 | United Kingdom . |

OTHER PUBLICATIONS

Simpson, Progress in Organic Coatings, 6:1–30 (1978).
Warson, Gloss Emulsion Paints, 2d Ed., Solihull Chemical Services, West Midlands, England (1983).
Rhoplex HG-74, Rohm and Haas Company Trade Sales Flyer (1986).
"m-TMI Bifunctional Monomer," Cyanamid Polymer Chemicals Department.
"TMI—A Bifunctional Monomer," Cyanamid.
Saxon et al., *Cellular Polymers*, 4: 117–149 (1985).
Shay, G. D., et al., "Urethane-Functional Alkali-Soluble Associative Latex Thickeners," *Journal of Coatings Technology*, vol. 58, No. 732, Jan. 1986, pp. 43–53.

(List continued on next page.)

*Primary Examiner*—Joseph L. Schofer
*Assistant Examiner*—Jeffrey T. Smith
*Attorney, Agent, or Firm*—Wendy A. Taylor

[57] ABSTRACT

A binder for use in high gloss latex paints comprises water, a copolymer, and less than about 1 weight percent surfactant. The copolymer comprises about 25 to about 60 weight percent soft monomer, about 40 to about 75 weight percent hard monomer, and about 1 to about 3 weight percent olefinic carboxylic acid monomer. In addition, the copolymer comprises about 0.5 to about 3 weight percent copolymerizable surfactant monomer and/or (i) about 0.5 to about 4 weight percent additional monomer selected from the group consisting of cyanoacetoxy-containing monomers and acetoacetoxy-containing monomers and (ii) about 0.5 to about 3 weight percent ethyleneureido-containing monomer.

6 Claims, No Drawings

OTHER PUBLICATIONS

Theodore, A. N., et al., "A Convenient Preparation of Acrylic–Urethane Nonaqueous Dispersions," *Journal of Coatings Technology*, vol. 57, No. 721, Feb. 1985, pp. 67–71.

Thomas, Mary R., "Isocyanatoethyl Methacrylate; A Heterofunctional Monomer for Polyurethane and Vinyl Polymer Systems," *Journal of Coatings Technology*, vol. 55, No. 703, Aug. 1983, pp. 55–61.

Chen, T. J., "Preparation and Polymerization of New Dual Active Functional Monomers," *Polymeric Materials Science and Engineering*, vol. 56, American Chemical Society Spring Meeting 1987, Denver, Colorado.

Dexter, Robin W., et al., "m-TMI, A Novel Unsaturated Aliphatic Isocyanate," Reprint from Jun. 1986 issue of *Journal of Coatings Technology*, vol. 58, No. 787, pp. 43–47.

Dexter, Robin W., et al., "m-TMI, A Novel Unsaturated Aliphatic Isocyanate," *Polymeric Materials Science and Engineering*, vol. 53, American Chemical Society Fall Meeting 1985, Chicago, Illinois.

HIGH-GLOSS LATEX PAINTS AND POLYMERIC COMPOSITIONS FOR USE THEREIN

CROSS-REFERENCE TO RELATED APPLICATIONS

This application is a continuation-in-part of Ser. No. 07/363,492, filed Jun. 8, 1989, now U.S. pat. No. 5,084,505 issued Jan. 28, 1992 and a continuation-in-part of Ser. No. 07/722,360, filed Jun. 19, 1991, now U.S. Pat. No. 5,173,534, issued Dec. 22, 1992, which is a continuation of Ser. No. 07/303,805, filed Jan. 30, 1989, now abandoned.

BACKGROUND

The present invention relates to high-gloss latex paints, binders capable of producing high-gloss paints, and a process for making the binders.

High-gloss paints have a specular gloss greater than about 70 percent reflectance based upon light having about a 60° angle of incidence. While oil-based paints can easily be formulated into high-gloss paints, such is not the case with latex paints. In addition, it is difficult to formulate high-gloss latex paints having good (a) flow and leveling, (b) film build, and (c) wet adhesion characteristics. The inability to readily formulate high-gloss latex paints is a significant drawback since oil-base paints are being phased out due to environmental restrictions limiting the volatile organic compounds (VOC) content of paints.

SUMMARY OF THE INVENTION

The present invention provides binders for producing high-gloss latex paints having good flow and leveling, film build, and wet adhesion characteristics. The binders comprise (i) water, (ii) less than about 1 weight percent noncopolymerizable surfactant, and (iii) a copolymer. In one version of the invention, the copolymer comprises (a) about 25 to about 60 weight percent soft monomer selected from the group consisting of non-functional acrylic monomers, non-functional methacrylic monomers, and mixtures thereof; (b) about 40 to about 75 weight percent hard monomer selected from the group consisting of alkenyl aromatic monomers, non-functional acrylic monomers, non-functional methacrylic monomers, acrylonitrile monomer, and mixtures thereof, provided that the acrylonitrile monomer comprises less than about 10 weight percent of the copolymer; (c) about 1 to about 3 weight percent olefinic carboxylic acid monomer; (d) about 0.5 to about 3 weight percent ethyleneureido-containing monomer; (e) about 0.5 to about 3 weight percent copolymerizable surfactant monomer containing a group having the formula $$R-O-(CH_2CHO)_x-$$

wherein R is selected from the group consisting of alkyl groups containing about 12 to about 20 carbon atoms and alkylaryl groups whose alkyl moiety contains about 8 to about 9 carbon atoms and x is greater than 40; and (f) about 0.5 to about 4 weight percent additional monomer selected from the group consisting of cyanoacetoxy-containing monomers and acetoacetoxy-containing monomers having the respective formulas

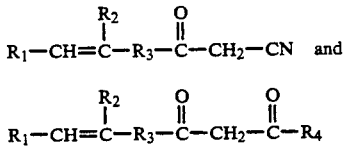

$R_1$ being selected from the group consisting of hydrogen and halogen, $R_2$ being selected from the group consisting of hydrogen, halo, thio, and monovalent organic radicals, $R_3$ being a divalent radical, and $R_4$ being selected from the group consisting of hydrogen and monovalent organic radicals.

The copolymer has an average particle size of less than about 250 nm and a calculated Tg of about 15° to about 35° C. In addition, monomers (a)-(c) constitute at least about 90 weight percent of the monomeric content of these copolymers.

The invention also encompasses (a) a process for synthesizing the binder, (b) a paint containing the binder, (c) a film formed by drying the paint, and (d) an article (e.g., a room) comprising a substrate (e.g., a wall) having at least one surface at least partially coated with the film. Regarding the binder synthesis process, this process comprises the steps of (I) combining water, the olefinic carboxylic acid monomer, the noncopolymerizable surfactant, and the copolymerizable surfactant monomer to form a composition; (II) adjusting the pH of the composition to about 6.5 to about 8.5 to form a pH adjusted composition; (III) adding the hard monomer, the soft monomer, and the additional monomer selected from the group consisting of cyanoacetoxy-containing monomers and acetoacetoxy-containing monomers to the pH adjusted composition to form a pre-emulsion; and (IV) delay adding and reacting the pre-emulsion and the ethyleneureido-containing monomer in a reactor charged with water and a seed and/or noncopolymerizable surfactant, the ethyleneureido-containing monomer being delay added to the reactor within the first 50 percent of the delay addition period.

The high-gloss paints of the present invention have desirable flow and leveling, film build, and wet adhesion characteristics.

As used in the specification and claims, the term "soft monomer" means a monomer whose homopolymer has a Tg of less than about −20° C.; the term "hard monomer" means a monomer whose homopolymer has a Tg of greater than about 30° C.; the term "non-functional monomer" means a monomer that is devoid of any group, e.g., hydroxyl, carboxyl, and amine, that can undergo further reaction after polymerization of the monomer; the terms "weight percent hard monomer," "weight percent soft monomer," "weight percent olefinic carboxylic acid monomer," "weight percent copolymerizable monomer," "weight percent additional monomer," "weight percent ethyleneureido-containing monomer," and "weight percent wet adhesion promoting monomer" each mean the total dry weight of the respective monomeric constituent ingredient employed in making the copolymer divided by the total dry weight of the monomers employed in making the copolymer, this quotient being multiplied by 100%; the term "weight percent noncopolymerizable surfactant" means the weight of the active noncopolymerizable surfactant employed in making the copolymer divided by the total weight of the monomers employed in making the copolymer, this quotient being multiplied by 100%; the term "average particle size" means the maximum cross-sectional dimension as measured by a Brookhaven Instrument Corp. BI-90 brand particle size analyzer; the term "organic radical" means any group containing at least one carbon atom; the term "inorganic radical" means any group devoid of carbon atoms; the term "alkyl" means cyclic and acyclic saturated hydrocarbon groups that can be either branched or unbranched; and the term "alkenyl aromatic monomers" means any organic compound containing at least one aromatic ring and at least one aliphatic-containing moiety having alkenyl unsaturation.

DETAILED DESCRIPTION OF THE INVENTION

In accordance with the present invention, the binder comprises water, less than about 1 weight percent noncopolymerizable surfactant, and a copolymer. Preferably, the binder comprises about 0.1 to about 1 weight percent noncopolymerizable surfactant and, more preferably about 0.25 to about 0.75 weight percent noncopolymerizable surfactant.

The noncopolymerizable surfactant is normally an anionic surfactant, a nonionic surfactant, or a mixture of two or more of these surfactants. Anionic surfactants include, but are not limited to, alkylphenolethoxylate sulfates and sulfonates, alkylsulfates and sulfonates, and mixtures thereof. Nonionic surfactants include, but are not limited to, alkylarylpolyether alcohols, alkylphenolethoxylates, alkylethoxylates, ethyleneoxide-/propylene oxide block copolymers, and mixtures thereof.

Generally about 25 to about 60 weight percent soft monomer, about 40 to about 75 weight percent hard monomer, about 1 to about 3 weight percent olefinic carboxylic acid monomer, up to about 3 weight percent copolymerizable surfactant, up to about 5 weight percent ethyleneureido-containing wet adhesion promoting monomer, and up to about 5 weight percent additional wet adhesion promoting monomer selected from the group consisting of (a) cyanoacetoxy-containing monomers, (b) acetoacetoxy-containing monomers, and mixtures of (a) and (b) are employed in making the copolymer. The preferred and more preferred concentrations of these copolymer constituents are shown in the following Table I:

TABLE I

| Monomer | Preferred, weight percent | More Preferred, weight percent |
|---|---|---|
| Soft Monomer | about 25 to about 45 | about 30 to about 40 |
| Hard Monomer | about 50 to about 70 | about 55 to about 65 |
| Olefinic Carboxylic Acid | about 1 to about 2.5 | about 1 to about 2 |
| Copolymerizable Monomer | about 0.5 to about 3 | about 0.5 to about 2 |
| ethyleneureido-containing monomer | about 0.5 to about 3 | about 0.5 to about 1.5 |
| additional wet adhesion promoting monomer | about 0.5 to about 4 | about 1 to about 3 |

Typical soft monomers include, but are not limited to, non-functional acrylic monomers and non-functional methacrylic monomers. A mixture of soft monomers can also be present in the copolymer.

Exemplary soft, non-functional acrylic and methacrylic monomers have the formula I

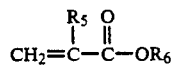

(I)

wherein $R_5$ is selected from the group consisting of hydrogen and methyl, and $R_6$ is an alkyl group, preferably having up to about 15 carbon atoms. (When $R_5$ is hydrogen, the monomer of formula I is an acrylic monomer and when $R_5$ is methyl, the monomer of formula I is a methacrylic monomer.) Soft, non-functional acrylic monomers include, but are not limited to, ethyl acrylate, n-butyl acrylate, iso-butyl acrylate, ethylhexyl acrylate, and n-octyl acrylate. Typical soft, non-functional methacrylic monomers are iso-decyl methacrylate, lauryl methacrylate, n-octyl methacrylate, and tridecyl methacrylate. n-Butyl acrylate is the preferred soft, non-functional monomer.

With respect to the hard monomer, the hard monomer is preferably selected from the group consisting of alkylene aromatic monomers, non-functional acrylic monomers, non-functional methacrylic monomers, and acrylonitrile monomer. More preferably, the hard monomer is selected from the group consisting of alkylene aromatic monomers and non-functional methacrylic monomers. (In fact it is preferred that the copolymer contain less than about 10 weight percent, and more preferably less than about 5 weight percent, acrylonitrile.) A mixture of hard monomers also can be present in the copolymer.

Preferred alkenyl aromatic monomers are represented by the formula II

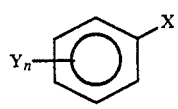

(II)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Vinyl is the most preferred X.

Y is an organic or inorganic radical. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ to about $C_4$ unsubstituted alkyl radicals.

Illustrative alkenyl aromatic monomers include styrene, o-methyl styrene, p-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

With respect to the hard, non-functional acrylic and methacrylic monomers, exemplary non-functional acrylic and methacrylic monomers have the above formula I wherein $R_5$ is as previously defined, while $R_6$ is an alkyl group preferably containing up to about 6 carbon atoms. Typical hard, non-functional methacrylic monomers include methyl methacrylate, ethyl methacrylate, iso-butyl methacrylate, iso-propyl methacrylate, and mixtures thereof. An exemplary hard, non-functional acrylic monomer is tert-butyl acrylate.

Concerning the olefinic carboxylic acid monomers, these monomers include both olefinic mono-carboxylic acid monomers and olefinic di-carboxylic acid monomers. Exemplary olefinic mono-carboxylic acids include, but are not limited to, acrylic acid, methacrylic acid, acryloxyacetic acid, methacryloxyacetic acid, acrylamidoglycolic acid, and mixtures thereof. Illustrative olefinic di-carboxylic acids include, but are not limited to, itaconic acid, fumaric acid, and mixtures thereof. The preferred olefinic carboxylic acid monomers are selected from the group consisting of acrylic acid, methacrylic acid, and mixtures thereof.

The soft monomer, the hard monomer, and the olefinic carboxylic acid together preferably constitute at least about 90 weight percent, and more preferably at least about 95 weight percent, of the monomers employed in making the copolymer.

The copolymerizable surfactant monomer employed in making the copolymer contains a group having the formula III:

$$R-O-(CH_2CHO)_x- \qquad (III)$$

wherein x is a number greater that 40 and R is selected from the group consisting of alkyl groups containing about 12 to about 20 carbon atoms and alkylaryl groups whose alkyl moiety contains about 8 to about 9 carbon atoms. Preferably, x is at least about 50 and more preferably about 50 to about 70. Copolymers made using copolymerizable surfactant monomers containing the groups of formula III provide binders having markedly improved flow and leveling properties without exhibiting any significant decrease in the gloss, film build, or wet adhesion characteristics of the binder.

Exemplary copolymerizable surfactant monomers containing the group of formula III include, but are not limited to copolymerizable surfactant monomers having the following formulas IV and V:

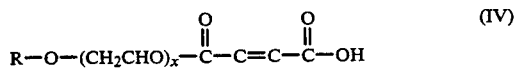

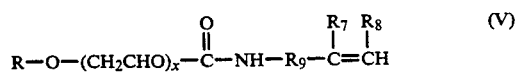

wherein R and x are as defined above, $R_7$ is selected from the group consisting of hydrogen, halogen, and alkyl groups containing up to about 5 carbon atoms, $R_8$ is selected from the group consisting of hydrogen and alkyl groups containing up to about 5 carbon atoms, and $R_9$ is a divalent organic radical. Generally, $R_9$ contains less than about 100 atoms, and usually less than about 60 atoms. In one embodiment of the invention, $R_9$ has the formula $-(R_{10})_n-(CH_2)-$, wherein $R_{10}$ is selected from the group consisting of substituted and unsubstituted divalent saturated aliphatic hydrocarbon radicals and divalent aromatic hydrocarbon radicals, and n is 0 or 1. Typically, $R_{10}$ contains from 1 to about 20 carbon atoms. Exemplary divalent, saturated aliphatic hydrocarbon radicals include alkylene radicals, preferably containing up to about 8 carbon atoms. The alkylene radicals can be cyclic, acyclic, or branched. Specific divalent saturated aliphatic hydrocarbon radicals include methylene, ethylene, propylene, butylene, isobutylene, pentylene, isopentylene, hexylene, cyclopentylene, cyclohexylene, and cycloheptylene. Exemplary divalent aromatic hydrocarbon radicals contain from 6 to about 12 carbon atoms. Typical divalent aromatic hydrocarbon radicals include phenylene, naphthylene, biphenylene, and benzylene. Exemplary substituents include methyl, ethyl, propyl, butyl, phenyl, naphthyl, tolyl, and benzyl.

In another embodiment of the invention, $R_9$ has the formula VI:

wherein $R_{11}$ is an alkylene group, preferably comprising up to about 14 carbon atoms. Alkylene groups can be cyclic, acyclic, and branched. Exemplary alkylene groups include ethylene, isopropylene, propylene, butylene, ethylethylene, dimethylethylene, 3-methyl-7-dimethylseptylene, 1,4-dimethylenecyclohexane, 1-methylene-cyclohexyl, and 2-phenyl-propylene.

In other embodiments of the invention, $R_9$ has either the formula $-O-R_{12}-$ or the formula VII

wherein $R_{12}$ is an alkylene group containing up to about 7 carbon atoms, $R_{13}$ is a divalent organic radical, $R_{14}$ and $R_{15}$ are each independently selected from the group consisting of monovalent alkyl radicals containing up to about 7 carbon atoms. Preferably, $R_{12}$ contains up to about 4 carbon atoms and, more preferably, $R_{12}$ is methylene. $R_{14}$ and $R_{15}$ are preferably each independently selected from the group consisting of monovalent alkyl radicals containing up to about 4 carbon atoms. More preferably, $R_{14}$ and $R_{15}$ are each methyl. Generally, $R_{13}$ contains less than about 100 atoms and usually less than about 50 atoms. In one embodiment of the invention, $R_{13}$ has the formula $-O-R_{12}-$, wherein $R_{12}$ is as defined above.

A commercially available copolymerizable monomer within the scope of formula IV is a monoester maleate of 50 mole ethoxylated p-nonylphenol available from American Cyanamid Co. as Aerosol MEM-NP-50. The synthesis of a composition within the scope of formula V is described in U.S. Pat. No. 4,514,552 and Shay et al., *Journal of Coatings Technology*, 58 (732): 43–53 (1986), these documents being incorporated herein in their entireties by reference. The most preferred amount of copolymerizable surfactant monomer employed in synthesizing the copolymer is about 0.5 to about 1.5 weight percent.

Exceptional improvements in wet adhesion are achieved by using at least one ethyleneureido-containing wet adhesion promoting monomer in conjunction with an additional wet adhesion promoting monomer selected from the group consisting of (a) cyanoacetoxy-containing monomers, (b) acetoacetoxy-containing monomers, and mixtures of (a) and (b). The combined amount of ethyleneureido-containing wet adhesion promoting monomer and additional wet adhesion promoting monomer employed in preparing the copolymer is preferably about 0.5 to about 5 weight percent, more preferably about 1 to about 4.5 weight percent, and most preferably about 2 to about 3 weight percent.

The ethyleneureido-containing monomers contain an ethyleneureido group of the formula VIII:

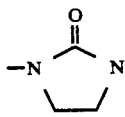
(VIII)

An exemplary ethyleneureido-containing monomers include, but are not limited to, 2-ethyleneureido-ethyl acrylate, 2-ethyleneureido-ethyl methacrylate, 2-ethyleneureido-ethyl acrylamide, 2-ethyleneureido-ethyl methacrylamide, 1-[2-(3-allyloxy-2-hydroxypropylamino)ethyl]-imidazolidin-2-one. Mixtures of ethyleneureido-containing monomers can be present in the polymer. A commercially available ethyleneureido-containing monomer is 1-[2-(3-allyloxy-2-hydroxypropylamino)ethyl]-imidazolid-in-2-one which is commercially known as Sipomer WAM monomer available from Alcolac.

Cyanoacetoxy-containing monomers and acetoacetoxy-containing monomers have the formulas IX and X, respectively,

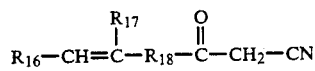
(IX)

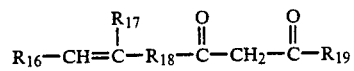
(X)

wherein $R_{16}$ is selected from the group consisting of hydrogen and halogen, $R_{17}$ is selected from the group consisting of hydrogen, halo, thio, and monovalent organic radicals, $R_{18}$ is a divalent radical, and $R_{19}$ is selected from the group consisting of hydrogen and monovalent organic radicals. Preferably, $R_{16}$ is hydrogen, $R_{17}$ is hydrogen or an alkyl radical having up to about 10 carbon atoms, $R_{18}$ is a cyclic or acyclic organic radical containing up to about 40 carbon atoms, and $R_{19}$ is an acyclic organic radical containing up to about 15 carbon atoms. More preferably, $R_{18}$ is an acyclic radical containing up to about 20 atoms in length, with any and all side groups each being up to about 6 atoms in length, and $R_{19}$ is hydrogen or an alkyl group containing up to about 7 carbon atoms. $R_{18}$ is most preferably alkylene and alkoxylene groups containing up to about 10 carbon atoms, and $R_{19}$ is most preferably methyl. While acetoacetoxyethyl methacrylate, cyanoacetoxyethyl methacrylate, and allylacetoacetate are reported in the literature, and while acetoacetoxyethyl methacrylate and allylacetoacetate are commercially available, acetoacetoxyethyl methacrylate is the acetoxy-containing monomer of choice.

The copolymer can optionally comprise a seed, generally having an average particle size of about 25 to about 80 nm.

The copolymers of the present invention generally have an average particle size of less than about 250 nm. Preferably, the average particle size of the copolymer is within the range of 90 to about 200 nm. Because small particle-sized polymers are more difficult to stabilize, it is preferred that the average particle size of the copolymer be as large as possible without unduly sacrificing its gloss enhancing capability.

The theoretical $T_g$ of the copolymers of the present invention is about 15° to about 35° C. The theoretical $T_g$ of each copolymer is calculated by multiplying the weight percent of each constituent monomer by the $T_g$ of a homopolymer made from that monomer and adding all the resulting numerical products.

There are several ways of determining the actual $T_g$ of the compositions. For purposes of the present specification and claims, the actual $T_g$ is determined by differential scanning calorimetry (DSC).

The copolymers are preferably substantially devoid (and more preferably totally devoid) of (a) conjugated dienes (e.g., butadiene, isoprene, 2,3-dimethyl butadiene, and 1,3-butadiene), (b) protonated unsaturated monomers having a tertiary or quaternary nitrogen group as described in UK Patent Application 2,091,277 (this patent application being incorporated herein in its entirety by reference), and (c) vinyl cyclohexanecarboxylate. The term "substantially devoid" means that less than about 0.1 weight percent (based the total dry weight of monomers employed in making the copolymer) of the particular monomer is employed in synthesizing the copolymer of the present invention. The term "totally devoid" means that less than about 0.01 weight percent (based the total dry weight of monomers employed in making the copolymer) of the particular monomer is employed in synthesizing the copolymer of the present invention.

The compositions of the present invention are made, for example, by a delayed addition polymerization process and a pre-emulsion polymerization process. Delayed addition and pre-emulsion polymerization techniques are well known to those skilled in the art and further discussion of them is therefore not warranted. Nevertheless, one synthesis technique yields a binder having exceptionally good wet adhesion and warrants elaboration. In this particular binder synthesis, water, an olefinic carboxylic acid monomer, a noncopolymerizable surfactant, and a copolymerizable surfactant monomer are combined to form a composition. Next, the pH of the composition is adjusted to about 6.5 to about 8.5 (preferably, to about 7 to about 8 and, more preferably, to about 7.25 to about 7.75) to form a pH adjusted composition. A hard monomer and a soft monomer are then added to the pH adjusted composition to form a pre-emulsion. More preferably, the pre-emulsion is made by combining the pH adjusted composition with a hard monomer, a soft monomer, and an additional monomer selected from the group consisting of (a) cyanoacetoxy-containing monomers, (b) acetoacetoxy-containing monomers, and mixtures of (a) and (b). Water is added to a reactor and heated, generally to between about 180° and 190° F., while purging the reactor with an inert gas, such as nitrogen, to remove substantially all oxygen from the reactor. A catalyst is then added to the reactor. Preferably, a seed and/or a surfactant is also added to the reactor. After the addition of the catalyst, the delay addition of the pre-emulsion, additional catalyst, and an aqueous solution of an ethyleneureido-containing monomer is then commenced. The addition of the pre-emulsion typically takes about 3 hours. The additional catalyst is generally delay added over a period of about 5 to about 30 percent, and preferably about 10 to about 20 percent longer than the pre-emulsion delay addition period. However, the aqueous ethyleneureido-containing monomer solution is typically added during the initial 50 percent (preferably the initial 35 percent, and more preferably the initial 25 percent) of the pre-emulsion delay addition period.

The polymerization processes yield a binder comprising the copolymer and water. However, as indicated in the above described processes, the binder optionally further comprises a noncopolymerizable surfactant and a catalyst. Typically, the binder has a surface tension greater than about 45 dynes/cm, and preferably between about 45 and about 55 dynes/cm. In addition, the binder commonly contains at least about 45 weight percent solids. The solids content of the binder is generally within the range of about 45 to about 55 weight percent.

Generally, the binder is substantially devoid (and preferably totally devoid) of a water-soluble carboxymethylcellulose such as described in U.S. Pat. No. 4,492,780, the patent being incorporated herein in its entirety by reference. As used in connection with water-soluble carboxymethylcellulose, the term "substantially devoid" means that less than about 0.1 weight percent (based the total dry weight of monomers employed in making the copolymer) of the water-soluble carboxymethylcellulose is employed in synthesizing the copolymer of the present invention. The term "totally devoid" means that less than about 0.01 weight percent (based the total dry weight of monomers employed in making the copolymer) of the water-soluble carboxymethylcellulose is employed in synthesizing the copolymer of the present invention.

The binder is used in a water-base high-gloss paint. A typical high-gloss paint comprises a rheology modifier, a coalescing aid, a thickening aid, a dispersing aid, a defoamer, a biocide, a filler, and the binder. While rheology modifiers, coalescing aids, thickening aids, dispersing aids, defoamers, biocides, and fillers suitable for use in water-base high-gloss paint are well known to those skilled in the art, the binder of the present invention displays exceptional characteristics especially with urethane-containing rheology modifier. High-gloss paints suitable for use in conjunction with the polymer generally have a pigment volume concentration (pvc) of less than about 25 volume by volume percent (v/v%). Preferably, the high-gloss paint has a pvc of about 15 to about 25 v/v%.

The present binder and paint do not require the presence of an amine having a boiling point in the range of about 50° to about 150° C. as required by U.S. Pat. No. 4,153,592. Therefore, the binder and paint are also preferably substantially devoid, and indeed more preferably totally devoid, of any such amine. When used in connection with these amines, the term "substantially devoid" means that the binder and paint contain less than about 1 part amine per 100 parts of the binder or 100 parts of the paint, respectively; and the term "totally devoid" means that the binder and paint contain less than about 0.1 part amine per 100 parts of the binder or 100 parts of the paint, respectively.

In use, the paint is applied to at least a portion of a surface of wall or other substrate. When applied to a white, glossy surface of a Form WB grade plain white chart (available from Leneta Company of Ho-Ho-Kus, N.J.), the paint, upon drying forms a film typically having a specular gloss of at least about 70 percent reflectance when measured at an angle of incidence of about 60°. Since specular gloss is directly proportional to the percent reflectance at a given angle of incidence, it is preferred that the percent reflectance obtained by such a film be at least about 75, more preferably at least about 80, and even more preferably at least about 85.

Accordingly, the copolymer-containing binder of the present invention is capable of providing a high gloss latex paint having very desirable wet adhesion, flow and leveling, and film build characteristics.

EXAMPLES

The following Examples 1-3 describe the preparation of three exemplary binders within the scope of the present invention. Each of these three binders were formulated into a paint and the resulting paints were separately tested for gloss, film build, flow and leveling, and wet adhesion. Description of these tests and test results are provided in Example 4.

Examples 1-4 are intended to illustrate—and not limit—the invention, the invention being defined by the claims.

EXAMPLE 1

Binder Preparation

A monomer mixture was prepared comprising methyl methacrylate (about 740.35 g), butyl acrylate (about 416 g), and acetoacetoxyethyl methacrylate (about 23.4 g). A pre-emulsion was formed by adding the monomer mixture to a composition comprising water (about 440 g), Alipal C0436 brand anionic surfactant (about 10.14 g; available from Rhone-Poulenc), Aerosol MEM-NP-50 brand monoester maleate of 50 mole ethoxylated p-nonyl phenol copolymerizable surfactant (about 11.7 g), methacrylic acid (about 19.5 g), and ammonium hydroxide (about 14 g).

Water (about 585 g) and Sipon LCP brand anionic surfactant (about 7.8 g; available from Rhone-Poulenc) were added to a reactor and heated while purging the reactor with nitrogen. When the contents of the reactor reached a temperature of about 185° F., about 32.5 ml of the pre-emulsion, sodium persulfate (about 1.95 g), and sodium metabisulfite (about 0.2 g) were added to the reactor.

After about 15 minutes, the delay addition to the reactor of the following ingredients was commenced: the remainder of the pre-emulsion, a catalyst solution comprising sodium persulfate (about 2.6 g) and water (about 50 g), and an aqueous solution comprising Sipomer WAM (about 10.4 g) and water (about 45.5 g). The remainder of the pre-emulsion, the catalyst solution and the WAM-containing solution were delay added over a period of about 3 hours, about 3.5 hours, and about 40 minutes respectively, while maintaining the temperature of the reactor contents at about 185° F.

The resulting binder contained about 50.8 weight percent solids; had an average particle size of about 181 nm, a viscosity of about 670 cps, and a pH of about 7.7. The pH of the binder was adjusted to about 8.6 with ammonium hydroxide.

EXAMPLE 2

Binder Preparation

A monomer mixture was prepared comprising methyl methacrylate (about 740.35 g) and butyl acrylate (about 416 g). A pre-emulsion was formed by adding the monomer mixture to a composition comprising water (about 390 g), Alipal C0436 brand anionic surfactant (about 10.14 g), Aerosol MEM-NP-50 brand monoester maleate of 50 mole ethoxylated p-nonyl phenol copolymerizable surfactant (about 11.7 g), and methacrylic acid (about 19.5 g). The pH of the pre-emulsion was adjusted to about 7 with ammonium hydroxide.

Water (about 585 g) and Sipon LCP brand anionic surfactant (about 7.8 g) were added to a reactor and heated while purging the reactor with nitrogen. When the contents of the reactor reached a temperature of about 145° F., about 32.5 ml of the pre-emulsion, about 28 ml of a catalyst solution containing sodium persulfate (about 4.55 g) and water (about 52 g), and about 6.5 ml of an activator solution comprising sodium metabisulfite (about 3.38 g) and water (about 52 g) were added to the reactor.

After about 15 minutes, the delay addition to the reactor of the remainder of the pre-emulsion and catalyst and activator solution as well as an aqueous solution of about 13 g Sipomer WAM in about 45.5 g water was commenced. During the entire delay addition period, the contents of the reactor were maintained at a temperature of about 145° F. The (a) pre-emulsion, (b) catalyst solution, (c) activator solution, and (d) WAM-containing aqueous solution were delay added to the reactor over a period of (a) about 3.5 hours, (b) about 4 hours, (c) about 4 hours, and (d) about 40 minutes from the commencement of the delay addition step.

The resulting binder contained about 51.6 weight percent solids; had an average particle size of about 144 nm, a viscosity of about 550 cps, and a pH of about 7.7. Using aqueous ammonium hydroxide, the pH of the binder was adjusted to about 8.6.

EXAMPLE 3

Binder Preparation

A monomer mixture was prepared comprising methyl methacrylate (about 524.5 g), butyl acrylate (about 320 g), methacrylic acid (about 15 g), and acrylonitrile (about 45 g). A pre-emulsion was formed by adding the monomer mixture to a composition comprising water (about 300 g), Alipal C0436 brand anionic surfactant (about 7.8 g), Aerosol MEM-NP-50 brand monoester maleate of 50 mole ethoxylated p-nonyl phenol copolymerizable surfactant (about 9 g), and acrylamide (about 9 g).

Water (about 450 g), sodium persulfate (about 1.3 g), and Sipon LCP brand anionic surfactant (about 6 g) were added to a reactor and heated while purging the reactor with nitrogen. When the contents of the reactor reached a temperature of about 180° F., a solution containing sodium persulfate (about 1.35 g) and water (about 40 g) was added to the reactor.

Next, the pre-emulsion was added to the reactor over a period of about 3 hours while maintaining the temperature of the reactor contents at about 185° F. At about the middle of the pre-emulsion delay addition period, an ammonium hydroxide solution containing about 7.5 g ammonium hydroxide in about 37 g water was then added to the reactor, followed by the addition of an aqueous solution of about 9 g Sipomer WAM in about 37 g water.

The resulting binder contained about 50.3 weight percent solids; had an average particle size of about 143 nm, a viscosity of about 490 cps, and a pH of about 7.7. The pH of the binder was adjusted to about 8.6 with sodium hydroxide.

EXAMPLE 4

Analysis of Pain Properties

The binders prepared in Examples 1–3 were each formulated into a separate paint and the properties of each paint were test in accordance with the methods detailed in this Example 4. The results of the gloss, film build (ICI viscosity), flow and leveling, and wet adhesion tests are set forth in the following Table II.

TABLE II

| Paint Formulation Using Binder of Example | Rheology Modifier | | | | | | | |
|---|---|---|---|---|---|---|---|---|
| | Acrysol RM-5 | | | | Acrysol RM-825 | | | |
| | Gloss[b] | F/B[a] ps | F/L[c] | WA[d] | Gloss | F/B, ps | F/L | WA |
| 1 | 76/41 | 0.9 | 9 | E[e] | 85/42 | 0.7 | 5 | E |
| 2 | | N/T[f] | | | 86/41 | 0.7 | 2 | S[g] |
| 3 | 80/44 | 0.85 | 4.5 | M[h] | 86/49 | 1.5 | >9 | M |

[a]F/B denoted film build and was determined in terms of poise (ps) using an ICI cone and plate viscometer.
[b]The numerator and the denominator are the specular gloss of the coating measured using a gloss meter set at 20° and 60°, respectively.
[c]F/L denoted flow and leveling with the rating being based on Leneta Leveling Test blade draw downs.
[d]WA denotes wet adhesion.
[e]E denotes excellent.
[f]N/T denotes not tested.
[g]S denotes satisfactory.
[h]M denotes moderate.

Gloss

A wet coating of the paint formulation prepared in Example 2 was applied to a Form WB grade plain white chart (available from Leneta Company) and drawn down using a 6 mil Bird applicator. The coating was dried in a constant temperature and constant humidity room for at least 7 days. The specular gloss of the coating was measured using a gloss meter set at 20° and 60°. The readings were recorded and are set forth in Table II supra.

Wet Adhesion

Wet adhesion was determined using a thumb-rub/-pick and peal test. This test consisted of applying a coating (about 6 mil) over an aged glossy alkyd substrate using a draw down bar. The coating was allowed to dry for about one week at room temperature. The dried coating was cut lengthwise through its middle with a sharp blade. A paper towel soaked with water was then placed over the cut coating for about 15 minutes. Immediately upon removing the towel, attempts were made to scratch the coating with a thumb nail. The result of the thumb-rub/pick and peal test is also set forth above in Table II. The rating order is excellent (E)>satisfactory (S)>moderate (M).

As indicated by the data in Table II, paints within the scope of this invention possess high-gloss as well as very acceptable flow and leveling, film build, and wet adhesion characteristics.

Although the present invention has been described in detail with reference to certain preferred versions thereof, other versions are possible. For example, the paint can include one or more ingredients that enhance other paint properties. Therefore, the spirit and scope of the appended claims should not necessarily be limited to the description of the preferred embodiments contained herein.

What is claimed is:

1. A copolymer comprising:
   (a) about 25 to about 60 weight percent soft monomer whose homopolymer has a $T_g$ of less than about $-20°$ C., the soft monomer being selected from the group consisting of nonfunctional acrylic monomers, non-functional methacrylic monomers, and mixtures thereof;
   (b) about 40 to about 75 weight percent hard monomer whose homopolymer has a $T_g$ of greater than about 30° C., the hard monomer being selected from the group consisting of alkenyl aromatic monomers, non-functional acrylic monomers, non-functional methacrylic monomers, acrylonitrile monomer, and mixtures thereof, provided that the acrylonitrile monomer comprises less than about 10 weight percent of the copolymer;
   (c) about 1 to about 3 weight percent olefinic carboxylic acid monomer;
   (d) about 0.5 to about 3 weight percent copolymerizable surfactant monomer containing a group having the formula $$R-O-(CH_2CHO)_x-$$

wherein R is selected from the group consisting of alkyl groups containing about 12 to about 20 carbon atoms and alkylaryl groups whose alkyl moiety contains about 8 to about 9 carbon atoms, x is greater than 40,
   (e) about 0.5 to about 4 weight percent additional monomer selected from the group consisting of cyanoacetoxy-containing monomers and acetoacetoxy-containing monomers having the respective formulas $$R_1-CH=C(R_2)-R_3-C(=O)-CH_2-CN \text{ and}$$

$$R_1-CH=C(R_2)-R_3-C(=O)-CH_2-C(=O)-R_4$$

wherein $R_1$ is selected from the group consisting of hydrogen and halogen, $R_2$ is selected from the group consisting of hydrogen, halo, thio and monovalent organic radicals, $R_3$ is a divalent radical, and $R_4$ is selected from the group consisting of hydrogen and monovalent organic radicals; and
   (f) about 0.5 to about 3 weight percent ethyleneureido-containing monomer, and monomers (a), (b), and (c) in total constitute at least about 90 weight percent of the monomeric content of the copolymer.

2. The copolymer of claim 1 comprising (a) about 25 to about 45 weight percent soft monomer; (b) about 50 to about 70 weight percent hard monomer; (c) about 1 to about 2.5 weight percent olefinic carboxylic acid monomer; (d) about 0.5 to about 3 weight percent copolymerizable surfactant monomer; (e) about 0.5 to about 4 weight percent of the additional monomer; and (f) about 0.5 to about 3 weight percent ethyleneureido-containing monomer.

3. The copolymer of claim 1 comprising (a) about 30 to about 40 weight percent soft monomer; (b) about 55 to about 65 weight percent hard monomer; (c) about 1 to about 2 weight percent olefinic carboxylic acid monomer; (d) about 0.5 to about 2 weight percent copolymerizable surfactant monomer; (e) about 1 to about 3 weight percent of the additional monomer; and (f) about 0.5 to about 1.5 percent ethyleneureido-containing monomer.

4. A binder comprising:
   (i) water;
   (ii) less than about 1 weight noncopolymerizable surfactant, and
   (iii) a copolymer formed by reacting:
   (a) about 25 to about 60 weight percent soft monomer whose homopolymer has a $T_g$ of less than about $-20°$ C., the soft monomer being selected from the group consisting of nonfunctional acrylic monomers, non-functional methacrylic monomers, and mixtures thereof.
   (b) about 40 to about 75 weight percent hard monomer whose homopolymer has a $T_g$ of greater than about 30° C., the hard monomer being selected from the group consisting of alkenyl aromatic monomers, non-functional acrylic monomers, non-functional methacrylic monomers, acrylonitrile monomer, and mixtures thereof, provided that the acrylonitrile monomer comprises less than about 10 weight percent of the copolymer;
   (c) about 1 to about 3 weight percent olefinic carboxylic acid monomer;
   (d) about 0.5 to about 3 weight percent copolymerizable surfactant monomer containing a group having the formula $$R-O-(CH_2CHO)_x-$$

wherein R is selected from the group consisting of alkyl groups containing about 12 to about 20 carbon atoms and alkylaryl groups whose alkyl moiety contains about 8 to about 9 carbon atoms, x is greater than 40,
   (e) about 0.5 to about 5 weight percent wet adhesion promoting monomer.

5. A binder comprising:
   (i) water;
   (ii) less than about 1 weight noncopolymerizable surfactant, and
   (iii) a copolymer formed by reacting:
   (a) about 25 to about 60 weight percent soft monomer whose homopolymer has a $T_g$ of less than about $-20°$ C., the soft monomer being selected from the group consisting of nonfunctional acrylic monomers, non-functional methacrylic monomers, and mixtures thereof.
   (b) about 40 to about 75 weight percent hard monomer whose homopolymer has a $T_g$ of greater than about 30° C., the hard monomer being selected from the group consisting of alkenyl aromatic monomers, non-functional acrylic monomers, non-functional methacrylic monomers, acrylonitrile monomer, and mixtures thereof, provided that the acrylonitrile monomer comprises less than about 10 weight percent of the copolymer;

(c) about 1 to about 3 weight percent olefinic carboxylic acid monomer;

(d) about 0.5 to about 3 weight percent copolymerizable surfactant monomer containing a group having the formula $$R-O-(CH_2CHO)_x-$$

wherein R is selected from the group consisting of alkyl groups containing about 12 to about 20 carbon atoms and alkylaryl groups whose alkyl moiety contains about 8 to about 9 carbon atoms, x is greater than 40, (e) about 0.5 to about 4 weight percent additional monomer selected from the group consisting of cyanoacetoxy-containing monomers and acetoacetoxy-containing monomers having the respective formulas $$R_1-CH=\overset{R_2}{\underset{|}{C}}-R_3-\overset{O}{\underset{\|}{C}}-CH_2-CN \quad \text{and}$$

$$R_1-CH=\overset{R_2}{\underset{|}{C}}-R_3-\overset{O}{\underset{\|}{C}}-CH_2-\overset{O}{\underset{\|}{C}}-R_4$$

wherein $R_1$ is selected from the group consisting of hydrogen and halogen, $R_2$ is selected from the group consisting of hydrogen, halo, thio and monovalent organic radicals, $R_3$ is a divalent radical, and $R_4$ is selected from the group consisting of hydrogen and monovalent organic radicals, and (f) about 0.5 to about 3 weight percent ethyleneureido-containing monomer.

6. A copolymer comprising:

(a) about 25 to about 60 weight percent soft monomer whose homopolymer has a Tg of less than about −20° C., the soft monomer being selected from the group consisting of nonfunctional acrylic monomers, non-functional methacrylic monomers, and mixtures thereof.

(b) about 40 to about 75 weight percent hard monomer whose homopolymer has a Tg of greater than about 30° C., the hard monomer being selected from the group consisting of alkenyl aromatic monomers, non-functional acrylic monomers, non-functional methacrylic monomers, acrylonitrile monomer, and mixtures thereof, provided that the acrylonitrile monomer comprises less than about 10 weight percent of the copolymer;

(c) about 1 to about 3 weight percent olefinic carboxylic acid monomer;

(d) about 0.5 to about 4 weight percent additional monomer selected from the group consisting of cyanoacetoxy-containing monomers and acetoacetoxy-containing monomers having the respective formulas $$R_1-CH=\overset{R_2}{\underset{|}{C}}-R_3-\overset{O}{\underset{\|}{C}}-CH_2-CN \quad \text{and}$$

$$R_1-CH=\overset{R_2}{\underset{|}{C}}-R_3-\overset{O}{\underset{\|}{C}}-CH_2-\overset{O}{\underset{\|}{C}}-R_4$$

wherein $R_1$ is selected from the group consisting of hydrogen and halogen, $R_2$ is selected from the group consisting of hydrogen, halo, thio and monovalent organic radicals, $R_3$ is a divalent radical, and $R_4$ being selected from the group consisting of hydrogen and monovalent organic radicals, and (e) about 0.5 to about 3 weight percent ethyleneureido-containing monomer, wherein monomers (a), (b), and (c) in total constitute at least about 90 weight percent of the monomeric content of the copolymer.

* * * * *